(12) United States Patent
He et al.

(10) Patent No.: US 12,242,887 B2
(45) Date of Patent: Mar. 4, 2025

(54) APPLICATION MANAGEMENT METHOD AND DEVICE, TERMINAL AND READABLE STORAGE MEDIUM

(71) Applicant: ZTE CORPORATION, Guangdong (CN)

(72) Inventors: Zhibin He, Guangdong (CN); Yong Kan, Guangdong (CN)

(73) Assignee: ZTE CORPORATION, Guangdong (CN)

( * ) Notice: Subject to any disclaimer, the term of this patent is extended or adjusted under 35 U.S.C. 154(b) by 478 days.

(21) Appl. No.: 17/620,703

(22) PCT Filed: Aug. 27, 2020

(86) PCT No.: PCT/CN2020/111600
§ 371 (c)(1),
(2) Date: Dec. 19, 2021

(87) PCT Pub. No.: WO2021/037111
PCT Pub. Date: Mar. 4, 2021

(65) Prior Publication Data
US 2022/0244985 A1   Aug. 4, 2022

(30) Foreign Application Priority Data
Aug. 29, 2019 (CN) .......................... 201910810521.6

(51) Int. Cl.
*G06F 9/455* (2018.01)
*G06F 9/48* (2006.01)

(52) U.S. Cl.
CPC ........ *G06F 9/485* (2013.01); *G06F 2209/482* (2013.01)

(58) Field of Classification Search
CPC .......................... G06F 9/485; G06F 2209/482
See application file for complete search history.

(56) References Cited

U.S. PATENT DOCUMENTS
2009/0178011 A1   7/2009   Ording et al.

FOREIGN PATENT DOCUMENTS

| CN | 105677460 A | 6/2016 | |
|---|---|---|---|
| CN | 108287760 A | 7/2018 | |
| CN | 109445917 A | 3/2019 | |
| CN | 109992367 A * | 7/2019 | ........... G06F 9/5027 |
| WO | WO2019128549 A1 | 7/2019 | |

OTHER PUBLICATIONS

WIPO, International Search Report issued on Nov. 19, 2020.
European Patent Office, extended European Search Report dated May 2, 2023, for corresponding EP application No. 20857624.9.

* cited by examiner

*Primary Examiner* — Diem K Cao
(74) *Attorney, Agent, or Firm* — Li & Cai Intellectual Property (USA) Office

(57) ABSTRACT

Embodiments of the present disclosure provide an application management method, an application management device, a terminal and a readable storage medium. The method includes: determining an application to be frozen on a terminal; detecting a sensor on the terminal applied for by the application to be frozen; and determining whether to freeze the application based on the application to be frozen and a type of the sensor applied for by the application to be frozen, and performing a corresponding operation.

11 Claims, 3 Drawing Sheets atent Application No. 201910810521.6, filed on
APPLICATION MANAGEMENT METHOD AND DEVICE, TERMINAL AND READABLE STORAGE MEDIUM

CROSS-REFERENCE TO RELATED APPLICATIONS

This is a National Phase Application filed under 35 U.S.C. 371 as a national stage of PCT/CN2020/111600, filed on Aug. 27, 2020, an application claiming the priority of Chinese Patent Application No. 201910810521.6, filed on Aug. 29, 2019, the contents of which are incorporated herein in their entirety by reference.

TECHNICAL FIELD

The present disclosure relate to, but are not limited to, the field of computer technology.

BACKGROUND

Functions of applications on a terminal are becoming richer and more and more powerful. As more applications are installed, a battery is consumed faster and the terminal gets hot noticeably even when the applications are not in use. The main reason is because a significant number of the applications are running in the background and take up system resources even though the applications do not run in the foreground.

The application freezing technology is a method for limiting occupation of system resources by applications mainly based on intelligent terminals. The method mainly includes forbidding occupation of system resources, such as a CPU, a sensor, a GPS navigation system, a memory and so on, to effectively reduce power consumption and prolong battery life, and also reduce heating by reducing system load.

After an application is frozen, the application does not consume resources any more, but the application itself is still alive, and various service logic connections between the application and other modules of the system are still present. Some applications monitor a state change of the system and accordingly apply and register for sensors which can wake up the system by such as a lifting gesture and a movement. If all the applications which apply for the sensors are frozen, the functions of the applications may be affected. On the contrary, if none of the applications which apply for the sensors is frozen, the freezing effect may be affected, which influences the original intention of saving energy. Therefore, how to effectively control the freezing of the applications which apply for the sensors becomes very important.

SUMMARY

An embodiment of the present disclosure provides an application management method, including: determining an application to be frozen on a terminal; detecting a sensor on the terminal applied for by the application to be frozen; and determining whether to freeze the application based on the application to be frozen and a type of the sensor applied for by the application to be frozen, and performing a corresponding operation.

An embodiment of the present disclosure further provides an application management device, including: a freeze determination module configured to determine an application to be frozen on a terminal; a detection module configured to detect a sensor on the terminal applied for by the application to be frozen; and a freezing module configured to determine whether to freeze the application based on the application to be frozen and a type of the sensor applied for by the application to be frozen, and perform a corresponding operation.

An embodiment of the present disclosure further provides a terminal, including a processor, a memory, a sensor and a communication bus; the communication bus is configured to enable connection and communication among the processor, the sensor and the memory; and the processor is configured to execute one or more computer programs stored in the memory to perform the application management method according to the present disclosure.

An embodiment of the present disclosure further provides a computer-readable storage medium storing one or more computer programs, which are executable by one or more processors to enable the one or more processors to perform the application management method according to the present disclosure.

DETAIL DESCRIPTION OF EMBODIMENTS

In order to make the objectives, technical solutions and advantages of the present disclosure clearer, the embodiments of the present disclosure are further described in detail below in conjunction with specific implementations and accompanying drawings. It should be understood that the specific embodiments described herein are merely intended to explain the present disclosure, rather than limiting the present disclosure.

Figure 1:
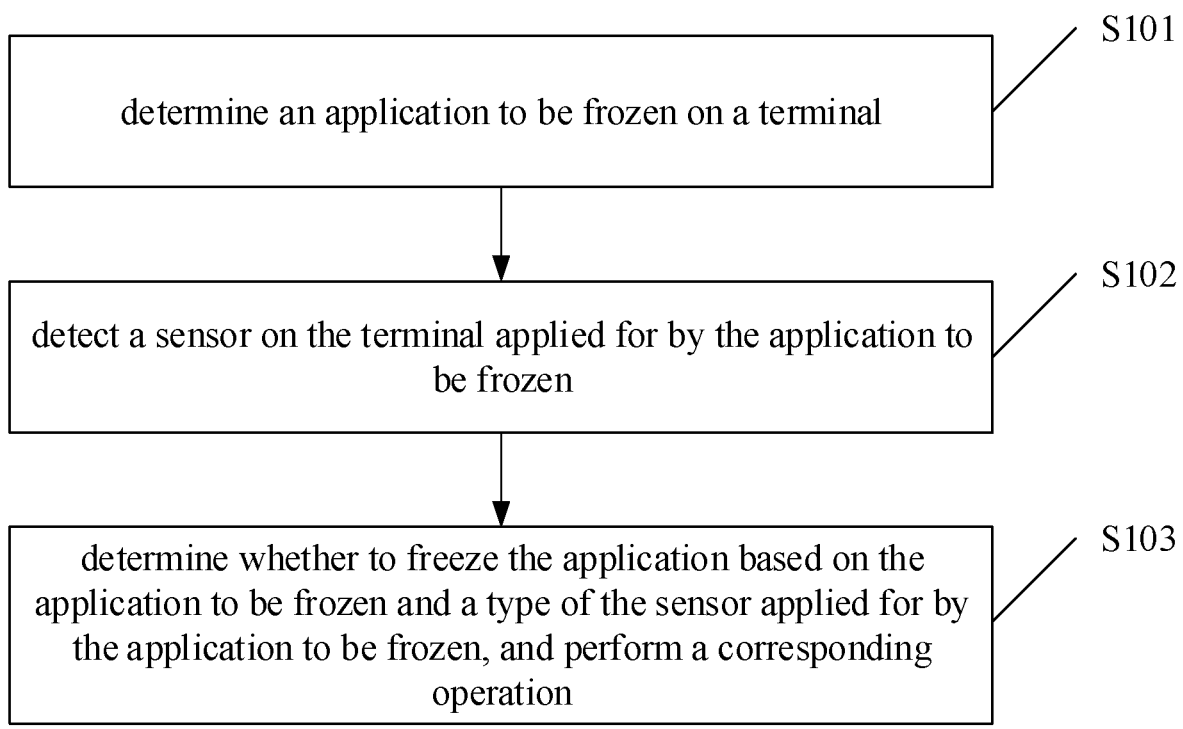
FIG. 1 is a flowchart illustrating an application management method according to the present disclosure.

FIG. 1 is a flowchart illustrating an application management method according to the present disclosure. With reference to FIG. 1, the method includes operations S101 to S103.

At the operation S101, determining an application to be frozen on a terminal.

At the operation S102, detecting a sensor on the terminal applied for by the application to be frozen.

At the operation S103, determining whether to freeze the application based on the application to be frozen and a type of the sensor applied for by the application to be frozen, and performing a corresponding operation.

An application freezing solution applied to a terminal is developed based on a Linux Cgroup Freezer subsystem and is used for starting and stopping processes to achieve the purpose of scheduling and using resources. A frozen application does not consume resources any more, but the application itself is still alive, and various service logic connections between the application and other modules of the system are still present. When a user wants to use the application, the user only needs to call the application from the background of the terminal. Thus, the application does not need to be opened again for running, which saves loading time of the application. When an application is running, the application usually applies for various sensors on the terminal as an aid to perform corresponding functions. For example, when a navigation application is in use, the navigation application applies for a gyroscope, an acceleration sensor and the like on the terminal. A sensor is a detection device, and can sense information to be measured, convert the sensed information into an electrical signal or information in a desired form according to a certain rule, and output into a terminal for subsequent processing. When an application on a terminal is to be frozen, the sensors applied for by the application need to be considered. Otherwise, the use of the terminal may be affected.

Not all the applications on the terminal are suitable for freezing, for example, the applications necessary for the running of the terminal, such as a phone application and a Short Message Service (SMS) application, are generally regarded as being unsuitable for freezing. Therefore, it is very important to determine under what circumstances an application can be frozen, that is, how to selectively freeze the applications.

In the present disclosure, before the operation of determining whether to freeze the application, the method may further include: classifying the applications on the terminal into types which at least include system critical application.

In general, the system critical application is a system application unsuitable for freezing, and this type of applications should keep running in normal cases so as to ensure normal operation of the functions of the terminal. For most terminals, the system critical application include applications installed at the factory, such as the applications of phone, SMS, date and time, which all belong to the system critical application. In addition, the system critical application may further include applications on the terminal which are used very frequently and determined according to a user habit, such as WeChat mainly for social contact. Although those applications are not installed at the factory, the applications are used so frequently that the freezing of the applications may directly affect the normal life of the user. Therefore, those applications may be classified as the system critical application for the user. In addition, the system critical application may also be the applications determined according to an input of the user, that is, the applications specified by the user. The above ways of determining the system critical application are all feasible in the present disclosure.

In the present disclosure, the operation of determining whether to freeze the application based on the application to be frozen and the type of the sensor applied for by the application to be frozen may include: when the application is a system critical application, determining not to freeze the application.

Since the application is a system critical application, the system critical application is not frozen when an application freezing process is performed in order not to affect the normal operation of the terminal. In other words, the applications such as the applications of phone, SMS and WeChat on the terminal are not frozen, so that dialing and answering can be normally performed, and text messages and/or instant messages (through WeChat) can be normally sent and received. For a terminal whose basic function is communication, such as a mobile phone, it is necessary to ensure the normal operation of the basic function.

In the present disclosure, before the operation of determining whether to freeze the application, the method may further include: classifying sensors on the terminal into types which at least include a first sensor type that needs to wake up the system and a second sensor type that does not wake up the system.

When the applications on the terminal are running, the applications may apply for various sensors on the terminal to ensure normal operations of the applications. The sensors on the terminal are classified into two types, with one sensor types waking up the system for running and the other sensor type not waking up the system. The applications which apply for the sensors that do not wake up the system may be frozen, resulting in no influence on the system.

In the present disclosure, the operation of determining whether to freeze the application based on the application to be frozen and the type of the sensor applied for by the application to be frozen may include: when the type of the sensor applied for by the application is the second sensor type, determining to freeze the application.

When a sensor applied for by an application is in the second sensor type, that is, the sensor does not wake up the system, the application may be directly frozen.

In the present disclosure, the operation of determining whether to freeze the application based on the application to be frozen and the type of the sensor applied for by the application to be frozen may include: when the type of the sensor applied for by the application is the first sensor type, determining not to freeze the application if the sensor applied for by the application to be frozen is further determined to be in a type of motion sensor.

When the type of the sensor applied for by the application to be frozen is the first sensor type, that is, the sensor wakes up the system, the sensor is further judged to decide whether to freeze the application. The sensors on the terminal may be further classified into a type of motion sensor and a type of environmental sensor. The motion sensors are software SensorList-Sports abstracted based on six basic hardware sensors, and are mainly motion-related sensors such as motion_detect, motion_wakeup and significant motion, and the motion sensors may also be gesture-related sensors such as a pickup-sensor. The motion sensors are the sensors for detecting motion of the terminal, such as an acceleration sensor and a gyroscope. For the applications which apply for the motion sensors, since the freezing effect of the applications is not ideal due to the sensors, and use experience of the applications may be affected after the applications are frozen, the applications are not frozen.

In the present disclosure, the operation of determining whether to freeze the application based on the application to be frozen and the type of the sensor applied for by the application to be frozen may include: when the type of the sensor applied for by the application is the first sensor type, determining not to freeze the application if the sensor applied for by the application to be frozen is further determined to be in the type of environmental sensor and the terminal is in a bright screen state.

The environmental sensors are mainly hardware-related sensors, such as a proximity sensor and a brightness sensor. In general, the environmental sensors are in an operating state only when the terminal is in the bright screen state. If the terminal is in a non-bright screen state, it may be directly determined that the application is to be frozen.

In the present disclosure, the method may further include: detecting a freezing condition of any one sensor; and releasing registration for the sensor when all applications which apply for the sensor are frozen.

In a case where all applications which apply for a certain sensor are frozen, it is impossible for the sensor to be called, so that the registration for the sensor may be released directly, which removes the possibility of re-applying for the sensor.

In the present disclosure, the method may further include: when a frozen application is unfrozen, determining a sensor applied for by the application before the application is frozen, and applying and registering for the sensor again.

The present disclosure provides an application management method, in which the application to be frozen on the terminal is determined, the sensor on the terminal applied for by the application to be frozen is detected, whether to freeze the application is determined based on the application to be frozen and the type of the sensor applied for by the application to be frozen, and a corresponding operation is performed. Whether to freeze the application is determined according to both the type of the application and the type of the applied sensor when the application freezing process is performed, so that the applied freezing solution is effectively improved, and the freezing effect is greatly improved without affecting normal use of the terminal.

Figure 2:
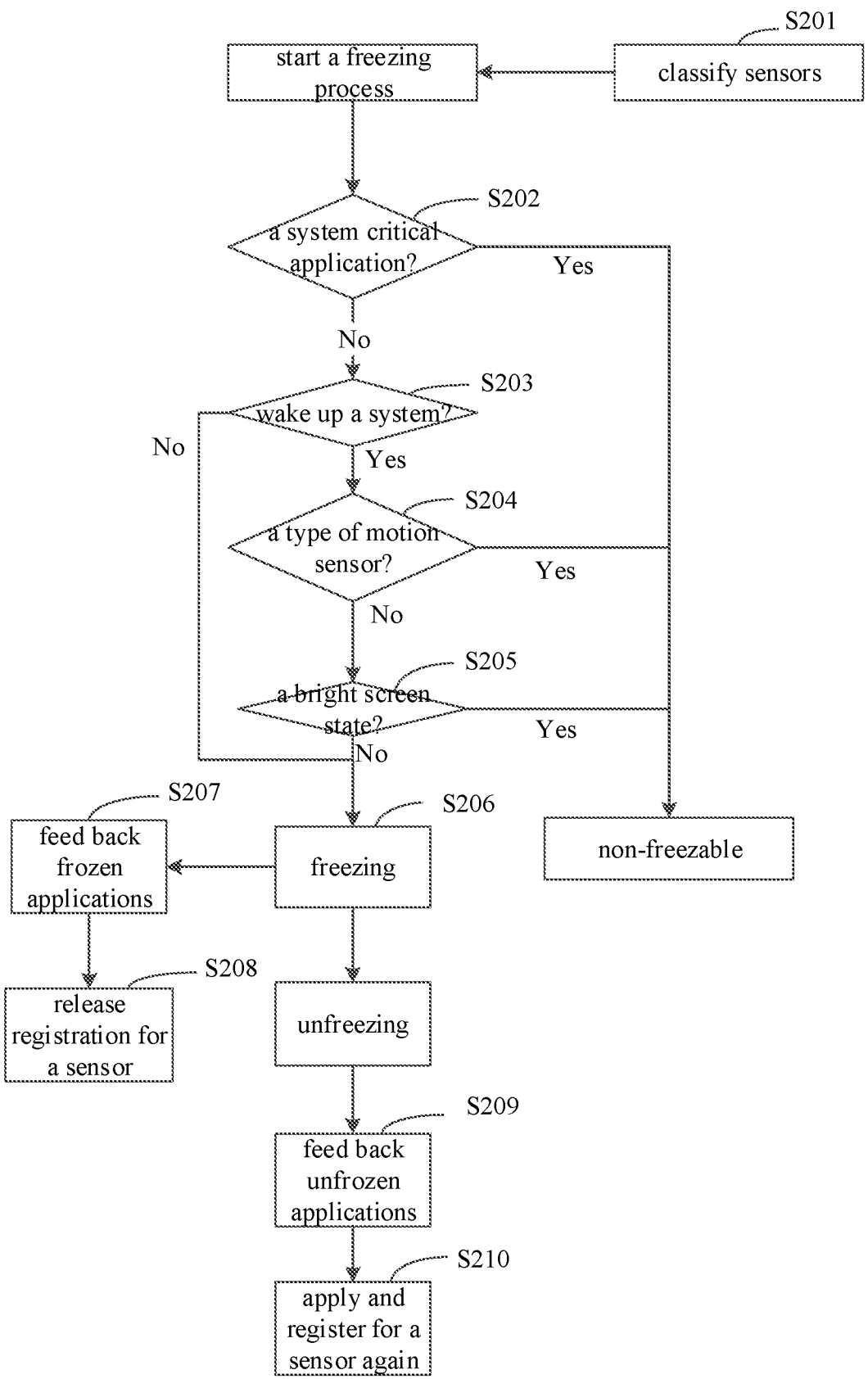
FIG. 2 is another flowchart illustrating an application management method according to the present disclosure.

FIG. 2 is another flowchart illustrating an application management method according to the present disclosure. With reference to FIG. 2, the method includes the following operations S201 to S210.

At the operation S201, all applied sensors and all applications of a terminal are classified, the sensors may be classified into a type of motion sensor and a type of environmental sensor, and each sensor is determined as to whether the sensor may wake up a system and marked accordingly.

The motion sensors are software SensorList-Sports abstracted based on six basic hardware sensors, and are mainly motion-related sensors such as motion_detect, motion_wakeup and significant motion, and the motion sensors may also be gesture-related sensors such as a pickup-sensor.

The environmental sensors are mainly hardware-related sensors, such as a proximity sensor, a brightness sensor and a gravity sensor.

At the operation S202, when a freezing module performs a freezing process on an application, the freezing process is terminated if the application is a system critical application; otherwise, a type of a sensor applied for by the application is detected and determined.

At the operation S203, when the applied sensor does not wake up the system, a determination result of freezable application is directly returned; and when the applied sensor may wake up the system, the type of the applied sensor is further detected.

At the operation S204, if the sensor applied for by the application is in SensorList-Sports, a determination result of non-freezable application is returned, and the freezing process of the application is terminated; otherwise, a state of a screen and the type of the sensor are further determined.

At the operation S205, if the screen is in a bright state and the sensor applied for by the application is in SensorList-Environment (such as a proximity sensor and a light sensor), a determination result of non-freezable application is returned, and the freezing process of the application is terminated; otherwise, a determination result of freezable application is returned.

At the operation S206, after a freezing processing program receive the determination result of freezable application, the freezing processing program freezes the application, monitors a unfrozen condition of the application, and initiates a freezing process after the application is unfrozen.

At the operation S207, after the application is frozen, a list of frozen applications is fed back to the system.

At the operation S208, after the list of frozen applications is received, sensors applied for by the frozen applications are searched for. If all applications applying for a certain sensor are frozen, registration for the sensor is released.

At the operation S209, after an application is unfrozen, a list of unfrozen applications is fed back to the system.

At the operation S210, after the list of unfrozen applications is received, sensors, which are applied for by the unfrozen applications before the applications are frozen, are searched for, and are applied and registered for again.

Figure 3:
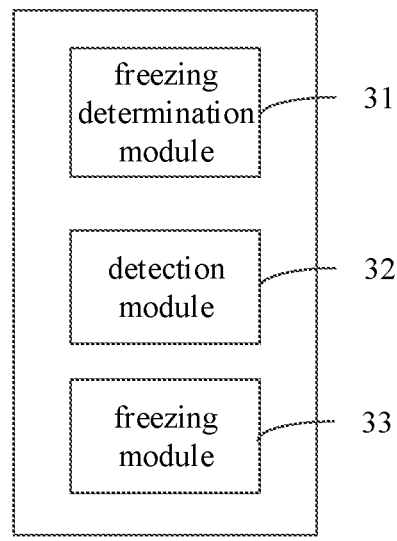
FIG. 3 is a schematic diagram of an application management device according to the present disclosure.

FIG. 3 is a schematic diagram of an application management device according to the present disclosure. With reference to FIG. 3, the device includes a freezing determination module 31, a detection module 32 and a freezing module 33.

The freezing determination module 31 is configured to determine an application to be frozen on a terminal.

The detection module 32 is configured to detect a sensor on the terminal applied for by the application to be frozen.

The freezing module 33 is configured to determine whether to freeze the application based on the application to be frozen and a type of the sensor applied for by the application to be frozen, and perform a corresponding operation.

An application freezing solution applied to a terminal is developed based on a Linux Cgroup Freezer subsystem and is used for starting and stopping processes to achieve the purpose of scheduling and using resources. A frozen application does not consume resources any more, but the application itself is still alive, and various service logic connections between the application and other modules of the system are still present. When a user wants to use the application, the user only needs to call the application from the background of the terminal. Thus, the application does not need to be opened again for running, which saves loading time of the application. When an application is running, the application usually applies for various sensors on the terminal as an aid to perform corresponding functions. For example, when a navigation application is in use, the navigation application applies for a gyroscope, an acceleration sensor and the like on the terminal. A sensor is a detection device, and can sense information to be measured, convert the sensed information into an electrical signal or information in a desired form according to a certain rule, and output into a terminal for subsequent processing. When an application on a terminal is to be frozen, the sensors applied for by the application need to be considered. Otherwise, the use of the terminal may be affected.

Not all the applications on the terminal are suitable for freezing, for example, the applications necessary for the running of the terminal, such as a phone application and a SMS application, are generally regarded as being unsuitable for freezing. Therefore, it is very important to determine under what circumstances an application can be frozen, that is, how to selectively freeze the applications.

In the present disclosure, before determining whether to freeze the application, the freezing module 33 may classify applications on the terminal into types which at least include system critical application.

In the present disclosure, the freezing module 33 may be configured to determine not to freeze the application when the application is a system critical application.

In the present disclosure, before determining whether to freeze the application, the freezing module 33 may classify sensors on the terminal into types which at least include a first sensor type that needs to wake up the system and a second sensor type that does not wake up the system.

In the present disclosure, the freezing module 33 may be configured to determine to freeze the application when the type of the sensor applied for by the application is the second sensor type.

When a sensor applied for by an application is in the second sensor type, that is, the sensor does not wake up the system, the application may be directly frozen.

In the present disclosure, the freezing module 33 may be configured to, when the type of the sensor applied for by the application is the first sensor type, determine not to freeze the application if the sensor applied for by the application to be frozen is further determined to be in a type of motion sensor.

In the present disclosure, the freezing module 33 may be configured to, when the type of the sensor applied for by the application is the first sensor type, determine not to freeze the application if the sensor applied for by the application to be frozen is further determined to be in the type of environmental sensor and the terminal is in a bright screen state.

In the present disclosure, the device may detect a freezing condition of any one sensor, and release registration for the sensor when all applications which apply for the sensor are frozen.

In the present disclosure, when a frozen application is unfrozen, the device may determine a sensor applied for by the application before the application is frozen, and apply and register for the sensor again.

The present disclosure provides an application management device, which determines the application to be frozen on the terminal, detects the sensor on the terminal applied for by the application to be frozen, determines whether to freeze the application based on the application to be frozen and the type of the sensor applied for by the application to be frozen, and performs a corresponding operation. When the device performs an application freezing process, the device determines whether to freeze the application according to both the type of the application and the type of the applied sensor, thereby effectively improving the applied freezing solution, and greatly improving the freezing effect without affecting normal use of the terminal.

Figure 4:
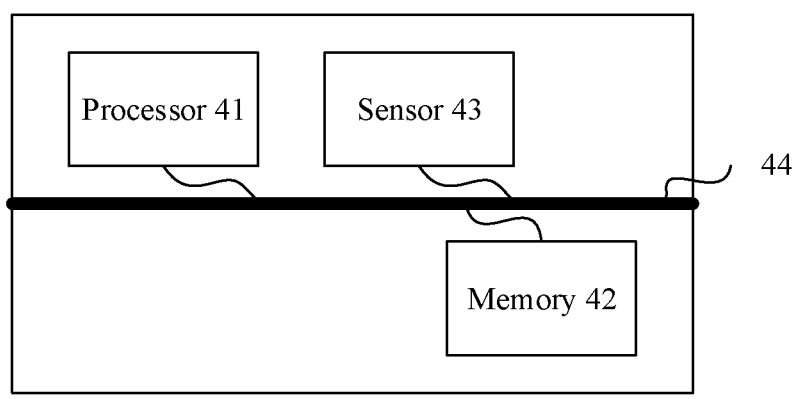
FIG. 4 is a schematic structural diagram of a terminal according to the present disclosure.

FIG. 4 is a schematic structural diagram of a terminal according to the present disclosure. As shown in FIG. 4, the terminal includes a processor 41, a memory 42, a sensor 43 and a communication bus 44.

The communication bus 44 is configured to enable connection and communication between the processor 41 and the memory 42.

The processor 41 is configured to execute one or more computer programs stored in the memory 42 to perform the application management method according to the present disclosure, which will not be described in detail here.

The present disclosure further provides a computer-readable storage medium, including volatile/nonvolatile and removable/non-removable media used in any method or technology for storing information (such as computer-readable instructions, data structures, program modules or other data). The computer-readable storage medium includes, but is not limited to, a Random Access Memory (RAM), a Read-Only Memory (ROM), an Electrically Erasable Programmable Read-Only Memory (EEPROM), a flash memory or other memories, a Compact Disc Read-Only Memory (CD-ROM), a Digital Video Disk (DVD) or another optical disc, a magnetic cassette, a magnetic tape, a magnetic disk or other magnetic storage devices, or any other medium which can be used to store the desired information and can be accessed by a computer.

The computer-readable storage medium in the present disclosure may be configured to store one or more computer programs, which are executable by a processor to perform at least one step of the application management method according to the present disclosure.

The present disclosure further provides a computer program (also called computer software), which may be distributed on a computer readable medium and executed by a computing system to perform at least one step of the application management method according to the present disclosure.

The present disclosure further provides a computer program product, including a computer readable system having the above computer program stored therein. In the present disclosure, the computer readable system may include the above computer-readable storage medium.

It should be understood by those of ordinary skill in the art that the functional modules/units in all or some of the steps, the systems and the devices in the method disclosed above may be implemented as software (which may be implemented as computer program codes executable by a computing system), firmware, hardware, or suitable combinations thereof. If implemented as hardware, the division between the functional modules/units stated above is not necessarily corresponding to the division of physical components; for example, one physical component may have a plurality of functions, or one function or step may be performed through cooperation of several physical components. Some or all of the physical components may be implemented as software executed by a processor, such as a central processing unit, a digital signal processor or a microprocessor, or may be implemented as hardware, or may be implemented as an integrated circuit, such as an application specific integrated circuit.

In addition, it is well known by those of ordinary skill in the art that the communication media generally include computer-readable instructions, data structures, computer program modules or other data in a modulated data signal, such as a carrier wave or other transmission mechanism, and may include any information delivery medium. Therefore, the present disclosure is not limited to any specific combination of hardware and software.

The above is a further detailed description of the embodiments of the present disclosure in conjunction with the specific implementations, but the specific implementations of the present disclosure are not limited to the above description. Several simple deductions or substitutions can be made by those of ordinary skill in the art without departing from the concept of the present disclosure, and should be considered to fall within the scope of the present disclosure.

What is claimed is:

1. An application management method, comprising:
    determining an application to be frozen on a terminal;
    detecting a sensor on the terminal applied for by the application to be frozen; and
    determining whether to freeze the application based on the application to be frozen and a type of the sensor applied for by the application to be frozen, and performing a corresponding operation,
    wherein the type comprises a first sensor type and a second sensor type, a sensor in the first sensor type wakes up a system of the terminal, while a sensor in the second sensor type does not wake up the system.

2. The application management method of claim 1, wherein before determining whether to freeze the application, the method further comprises:

classifying applications on the terminal into types which at least comprise system critical application.

3. The application management method of claim 2, wherein determining whether to freeze the application based on the application to be frozen and the type of the sensor applied for by the application to be frozen comprises:
determining not to freeze the application in response to a case where the application is the system critical application.

4. The application management method of claim 1, wherein before determining whether to freeze the application, the method further comprises:
classifying sensors on the terminal into types which at least comprise a first sensor type and a second sensor type.

5. The application management method of claim 4, wherein determining whether to freeze the application based on the application to be frozen and the type of the sensor applied for by the application to be frozen comprises:
determining to freeze the application in response to a case where the sensor applied for by the application is in the second senor type.

6. The application management method of claim 4, wherein determining whether to freeze the application based on the application to be frozen and the type of the sensor applied for by the application to be frozen comprises:
further determining the type of the sensor applied for by the application in response to a case where the type of the sensor applied for by the application is the first sensor type; and
determining not to freeze the application in response to a case where the type of the sensor applied for by the application is a type of motion sensor.

7. The application management method of claim 4, wherein determining whether to freeze the application based on the application to be frozen and the type of the sensor applied for by the application to be frozen comprises:
further determining the type of the sensor applied for by the application in response to a case where the type of the sensor applied for by the application is the first sensor type; and
determining not to freeze the application in response to a case where the type of the sensor applied for by the application is a type of environmental sensor and the terminal is in a bright screen state.

8. The application management method of claim 1, further comprising:
detecting a freezing condition of any one sensor; and
releasing registration for the sensor in response to a case where all applications applying for the sensor are frozen.

9. The application management method of claim 8, further comprising:
unfreezing a frozen application, determining a sensor applied for by the unfrozen application before the application is frozen, and applying and registering for the sensor again.

10. A terminal, comprising a processor, a memory, a sensor and a communication bus;
the communication bus is configured to enable connection and communication among the processor, the sensor and the memory; and
the processor is configured to execute one or more computer programs stored in the memory to perform the application management method of claim 1.

11. A non-transitory computer-readable storage medium having one or more computer programs stored therein, wherein when the one or more computer programs are executed by one or more processors, the one or more processors perform the application management method of claim 1.

* * * * *